United States Patent [19]

Macovski

[11] 4,400,721
[45] Aug. 23, 1983

[54] TRANSITION SYSTEM FOR COLOR TELEVISION RECEIVERS

[76] Inventor: Albert Macovski, 2505 Alpine Rd., Menlo Park, Calif. 94025

[21] Appl. No.: 282,400

[22] Filed: Jul. 13, 1981

[51] Int. Cl.$^3$ ............................................ H04N 9/535
[52] U.S. Cl. ............................................................ 358/37
[58] Field of Search ........................ 358/37, 39, 40, 36

[56] References Cited

U.S. PATENT DOCUMENTS

| 4,181,917 | 1/1980 | Richman | 358/36 |
| 4,316,215 | 2/1982 | Yasumoto et al. | 358/37 |
| 4,337,479 | 6/1982 | Tomimoto et al. | 358/37 |
| 4,355,326 | 10/1982 | Lee | 358/37 |

Primary Examiner—Richard Murray

[57] ABSTRACT

The response of color television signals are improved by adding a high frequency luminance component which is proportional to the color-difference signal so as to provide color signals with correct transitions. The ratio of the derivative of the color difference signal to the derivative of the low frequency portion of the luminance signal is used to weight the amplitude of the luminance component.

4 Claims, 5 Drawing Figures

TRANSITION SYSTEM FOR COLOR TELEVISION RECEIVERS

BACKGROUND OF THE INVENTION

1. Field of the Invention

This invention relates to color television receivers. In a primary application it relates to receivers using color television systems having reduced chrominance bandwidth with the associated poor transient response at color edges.

2. Description of the Prior Art

The present commercial broadcast color television system, in both the United States and other countries, employs a reduced chrominance bandwidth and a wide luminance bandwidth for overall bandwidth conservation. This color system makes use of the reduced acuity of human vision to color difference signals. It is described in a paper by A. V. Bedford, "Mixed Highs in Color Television," Proceedings IRE, Vol. 38, No. 9, p. 1003, September 1950. The system is called the "mixed highs" system since the high frequency luminance information is applied equally to each color channel. Unfortunately this approach often results in distorted color edges. For example, in a transition region, a specific color can be increasing while the applied luminance transition information can be of the opposite polarity. Similarly, a luminance transition can be applied to a color signal which is not changing.

SUMMARY OF THE INVENTION

An object of this invention is to provide a system for improving the transient response and picture quality of color television receivers.

It is a further object of this invention to provide a method of supplying the correct transition amplitudes and polarities to color television signals.

Briefly, in accordance with the invention, the high frequency luminance or transition information is applied to each color channel based on components of the color difference signal. In one embodiment the ratio of the derivative of the color difference signal to that of a low-pass filtered luminance signal is used to determine the amount and polarity of high frequency luminance information added.

BRIEF DESCRIPTION OF THE DRAWINGS

For a more complete disclosure of the invention reference may be made to the following detailed description of several illustrative embodiments thereof which are given in conjunction with the accompanying drawings, of which.

DESCRIPTION OF THE PREFERRED EMBODIMENT

In the current practiced system of color television receivers the high frequency luminance information added to the color signals is of somewhat arbitrary amplitude and polarity. It is applied equally to each color channel whether the transitions in that channel are positive, negative, or zero. This often results in distorted edges and seriously limits the picture quality of the reproduced color images. In this invention,, use is made of the very high correlation between the color signals and the luminance signals. Therefore the color difference signals themselves can be used to determine the correct amplitude and polarity of the luminance transition information. This provides a much improved color image with no associated increase in bandwidth.

Improvement in the image quality of color television displays is clearly more important than ever. Large screen displays are being used in projection systems in addition to other improved display devices. In these larger formats the edge distortions, especially in high saturation color regions, represents the most serious deterioration of the image. This invention dramatically improves the fidelity of these images without changing the bandwidth or the system standards.

The distortion in present systems can clearly be seen when colored lettering is displayed. The horizontal bars such as those in the letters E and L, have normal saturation and crisp outlines. The vertical bars, however, experience soft edges and severe desaturation resulting in a very unsatisfactory, difficult to read, display.

Figure 1:
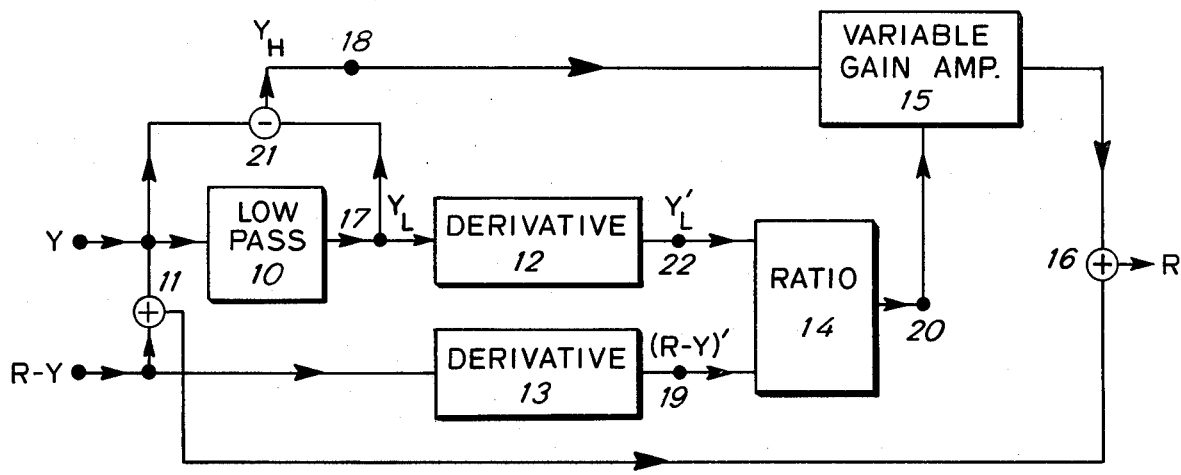
FIG. 1 illustrates a block diagram of the invention for improving the edge detail of a color channel.

An understanding of the broad aspects of the invention may best be had by reference to FIG. 1 of the drawings. The invention is shown, by example, as operating on the red channel. As such the standard luminance Y and red color-difference signal R−Y are used. It should be understood, however, that the identical system would be used on the green and blue channels using G−Y and B−Y respectively.

The basic purpose of this invention is to add the high-frequency transition information with its correct amplitude and polarity, unlike what is presently done. To accomplish this, as shown in FIG. 1, we take $Y_H$, the high-frequency components 18 of the luminance signal Y and apply them to the resultant color signal R in a manner dependent on the color difference signal R−Y. As is shown, the high frequency components of the luminance signal $Y_H$ are derived by subtracting the low frequency signal $Y_L$ from the input luminance signal Y. Thus Y is applied to low pass filter 10 to form $Y_L$, the low-passed luminance signal 17. This is subtracted from the luminance signal Y in subtractor 21 to form $Y_H$.

The amount and polarity of $Y_H$ which is applied to the output color channel is determined by the ratio of the derivative of the color difference signal to the derivative of the low-passed luminance signal. The term derivative is being used broadly as an operation which determines the amplitude of a transition. Therefore derivative operations 12 and 13 can be a classic RC differentiator using a very small time constant or various types of high pass filters which produce an output indicating the magnitude and polarity of transitions.

A low frequency luminance signal Yis formed, as previously indicated, by passing Y through low pass filter 10. Filter 10 has a bandwidth comparable to that used with the color difference signals so that the transitions will be similar. The low passed Y signal 17 is applied to differentiator 12 to form $Y_L'$, signal 22, and the color difference signal (R−Y) is applied to differentiator 13 to form (R−Y)', signal 19. The ratio of these derivatives, $(R-Y)'/Y_L'$ is taken in ratio function 14. This is a divider system which can be implemented in a variety of ways which are well-known in the literature. One approach is digital, while another uses the logarithmic characteristics of junction diodes to first subtract the logs of the two signals and then take an antilog to form a ratio.

The ratio or quotient 20 is used to control the gain of variable gain amplifier 15 which amplifies the high frequency luminance signal 18. The final color signal, R in this case, is formed by first adding Y and (R−Y) is adder 11 as is done in conventional receivers. Controlled polarity and amounts of $Y_H$ are then added using adder 16 to provide a high-fidelity R signal containing the correct high frequency components.

Figure 2:
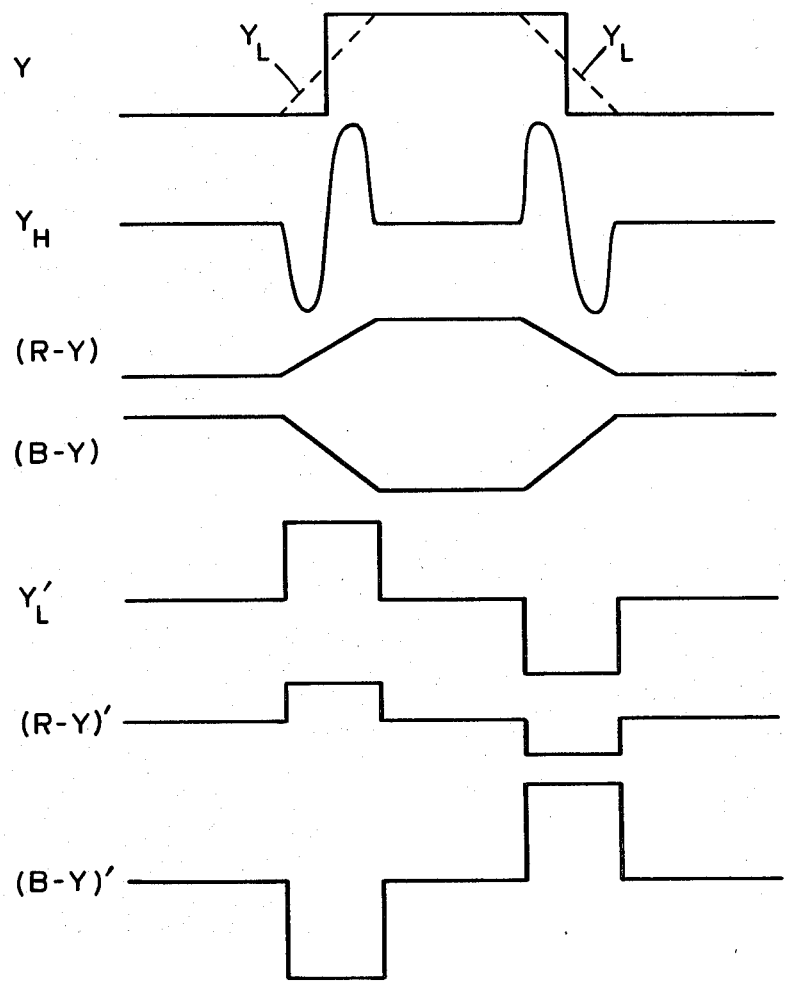
FIG. 2 illustrates the system operation using representative waveforms.

FIG. 2 is a typical example of the waveforms used. A transition is shown where the resultant image region is getting brighter and redder. The luminance Y is experiencing a positive step. The high frequency components $Y_H$ are shown in the vicinity of the transitions. The color difference signal (R−Y) is going positive while (B−Y) is going negative by a larger amount as shown. These signals have sloped transitions since, in the color television transmitter and receiver, they experience low-pass filtering. In a conventional receiver, as presently practiced, the high frequency luminance signal $Y_H$ would go equally to form all color signals. This is the classic bypassed luminance configuration. As can be seen, the resultant R signal consists of the wideband Y signal plus the narrow band (R−Y) signal. The R signal would thus have the sum of both sloping and rapid edges, distorting the transition. The situation is worse for the (B−Y) signal since it is going negative. Here the positive going fast transitions of Y and the negative going slow transitions of (B−Y) combine to produce highly distorted edges.

In implementing the present invention, we make use of the fact that the time of transitions of the luminance and color difference signals are highly correlated. A low frequency luminance signal $Y_L$ shown in dotted lines is formed which has a bandwidth comparable to that of the color difference signals. Its transition times are thus comparable with those of (R−Y) and (B−Y). As shown, its derivative, $Y_L'$, represents the amplitude and polarity of the transitions of Y. The ratio of (R−Y)', the derivative of color difference signal (R−Y), to $Y_L'$ is always positive. In FIG. 1, this ratio determines the amount of $Y_H$ which is added to (R−Y). As is seen in FIG. 2, if this ratio multiples $Y_H$ and the result is added to (R−Y), the sloping edges will become rapid transitions coinciding with those of Y.

Similarly the ratio of (B−Y)' to $Y_L'$ is always negative and of a larger magnitude than (R−Y)'/$Y_L'$. Using (B−Y)'/$Y_L'$ to weight the $Y_H$ signal forms an inverted and amplified version of $Y_H$ which, when added to (B−Y), provides the desired rapid transitions. Thus both (R−Y) and (B−Y) are restored to their correct waveshapes, and the edge distortions are removed.

In FIG. 2, the relative timing amongst the various signals are all correct. Clearly these signal do not start out with the correct timing because of the various delays involved in filtering. Therefore it is assumed that various delay elements are introduced so as to affect the correct timing. This applies to all of the circuitry shown. This, of course, is common practice in existing color television instrumentation.

Mathematically the system of FIG. 1 performs the operation $$R = Y + (R - Y) + \frac{(R - Y)'}{Y_L} Y_H$$

where the last term provides the high frequency components of (R−Y). This system will accommodate almost all signal conditions encountered. There are a few special cases which will not achieve complete compensation. However, it must be recalled that, in the present system, the edges are always distorted. In rare cases the scene will contain a high frequency repetitive signal, beyond the bandwidth of the color difference signals. In that case (R−Y) and (R−Y)' will be zero and this high frequency component will be applied equally to all channels and thus be colorless. This is in accord with the "mixed highs" principle previously described. However, in the vast majority of cases we are dealing with edges of various structures which can be compensated as shown.

Figure 3:
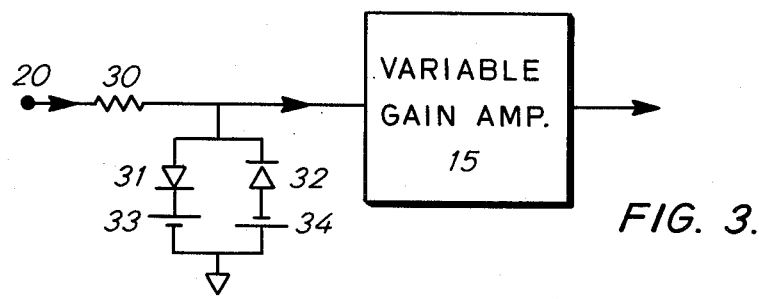
FIG. 3 illustrates a modification of an embodiment of the invention.

In any ratio or division operation there is always the possibility of excessive gain under certain conditions. For example, under some circumstances, there can be a high frequency Y signal $Y_H$, without a $Y_L'$ signal. To prevent excessive amplification of the $Y_H$ signal, the output of ratio 14, signal 20, is limited as shown in FIG. 3. This is a conventional double diode limiter where, if signal 20 exceeds positive voltage 33 or negative voltage 34, it is clipped by resistor 30 and diodes 31 and 32 respectively. This clipping limits the gain of variable gain amplifier 15. It should be emphasized that this clipping action is not a clipping of the signal itself, but a limiting of the maximum gain.

For normal transitions, however, the clipping system of FIG. 3 will rarely be necessary since the system is self-compensating. Luminance transitions normally have their low frequency components with the associated $Y_L'$.

Figure 4:
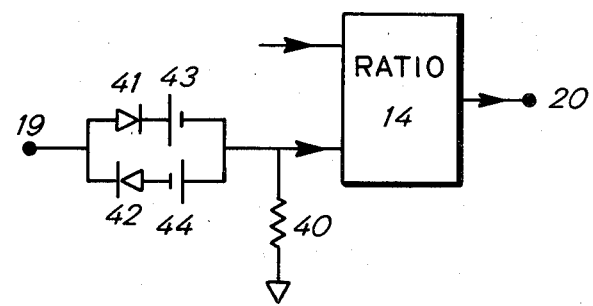
FIG. 4 illustrates another modification of an embodiment of the invention.

Another approach for insuring against errors is to make use of the fact that the primary purpose of this invention is to improve the edge response for relatively saturated regions. In regions of very low color saturation, each color signal is primarily luminance and thus has a wide bandwidth and relatively rapid transitions. In this low saturation condition, signals may be experienced where both (R−Y)' and $Y_L'$ are relatively low and present the possibility of having an excessive ratio due to inaccuracy. This can be prevented using the system of FIG. 4. Here low values of (R−Y)' are prevented from reaching ratio system 14. If (R−Y)' is less positive than voltage source 43, or less negative than voltage source 44, neither diodes 41 or 42 will conduct, thus providing a zero output to ratio system 14 and a zero output on signal 20 which controls variable gain amplifier 15. When (R−Y)' exceeds these voltages sources, either diode 41 or 42 will conduct through resistor 40 and apply (R−Y)' to ratio system 14.

A variety of other limiting systems can be used. The systems of FIGS. 3 and 4 can be used individually or together to prevent undesirable signal conditions. Other approaches, such as adding a minimum fixed voltage to $Y_L'$, will also prevent the ratio from becoming excessive. In any case, it must be emphasized, that the system of FIG. 1, as shown, will handle almost all standard signal conditions.

Figure 5:
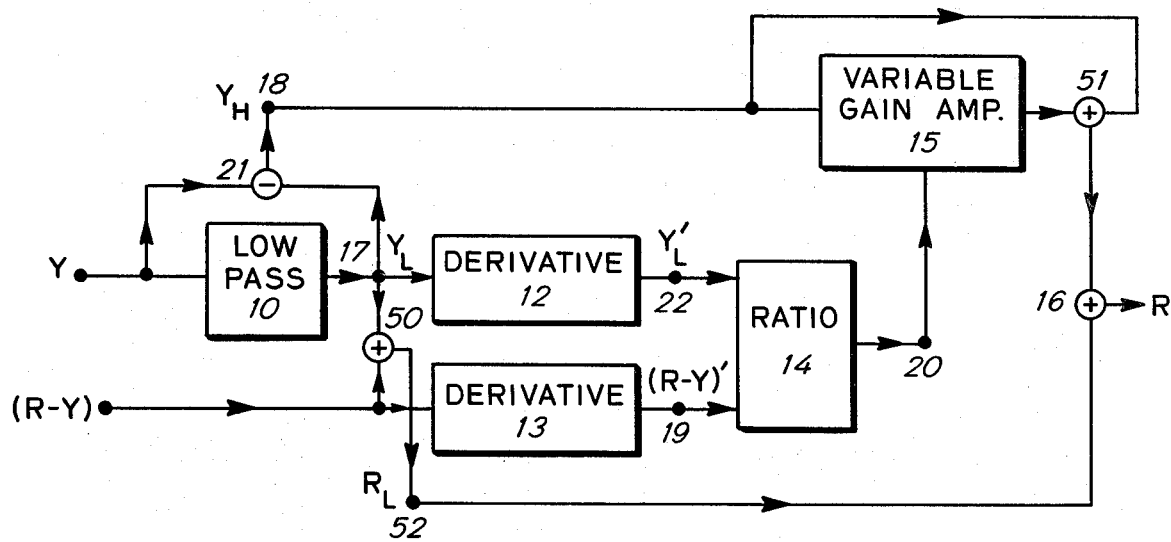
FIG. 5 illustrates a block diagram of an alternate embodiment of the invention.

In FIG. 1 the high frequency luminance signal $Y_H$ is used to correct the edges of the color difference signal. The system of FIG. 5 is similar, except that the high frequency luminance signal $Y_H$ now provides the entire transition, rather than just that part corresponding to the color difference signal. The resultant equation for the color signal R is given by $$R = Y_L + (R - Y) + \frac{Y_L + (R - Y)'}{Y_L} Y_H$$

$$= Y_L + (R - Y) + \left[1 + \frac{(R - Y)'}{Y_L}\right] Y_H$$

$$= R_L + \left[1 + \frac{(R - Y)'}{Y_L}\right] Y_H = R_L + \frac{R'_L}{Y_L} Y_H$$

As indicated, a low frequency color signal, R is first formed by adding (R−Y) and $Y_L$. The high frequency components are then supplied by weighting $Y_H$ with a constant, unity, plus the ratio of (R−Y)' to $Y_L$' as before. This is a small variation on the system of FIG. 1. It has the advantage that the high frequency components are applied in one operation so that there is no danger of improper matching of the high frequency components of Y and $Y_H$. As in the system of FIG. 1, the output becomes $Y = Y_L + Y_H$ in the absence of the color difference signal. Since $Y_H$ is formed as the difference between Y and $Y_L$, the sum of $Y_L$ and $Y_H$ restores the desired wideband Y signal. This is one of the advantages of forming $Y_H$ in this manner as compared to the use of a high-pass filter.

Referring to FIG. 5, the low frequency luminance signal $R_L$ is formed by adding signal 17, $Y_L$ to (R−Y) in adder 50 to form signal 52, $R_L$. High frequency luminance signal $Y_H$ is again formed by subtracting $Y_L$ from Y in subtractor 21 to form signal 18. A constant amount of $Y_H$ is then added to the gain-controlled $Y_H$ component in adder 51 to provide the total high frequency transition signals for R. The output of adder 51 is added to $R_L$ in adder 16 to form R. All of the previously described nonlinear operations of FIG. 3 and FIG. 4 can clearly be applied to the system of FIG. 5.

The various systems shown are simple examples of the basic concept of this invention. This concept relates to the fact that the transition positions of the luminance signal and the color-difference signals are highly correlated so that the luminance transition components can be used to compensate for the poor edge response of the color difference signals. A variety of more complex schemes can be used to exploit this concept. These can include systems which first acertain whether the transitions are indeed present in both signals before applying the correction waveform. In general, however, the addition of high-frequence luminance components, in a selective controlled fashion, to enhance the color difference signals, can dramatically improve the quality of color television receiver images within the confines of the present color standards.

What is claimed:

1. In a method for enhancing the high frequency response of color television signals which are derived from a luminance signal and a plurality of color difference signals the steps of:
    low-pass filtering the luminance signal;
    deriving the high frequency components of the luminance signal by subtracting the low-pass filtered luminance signal from the luminance signal; and
    applying the high frequency components of the luminance signal to the color television signals in an amount proportional to components of the color-difference signals.

2. In a method for enhancing the high frequency response of color television signals which are derived from a luminance signal and a plurality of color difference signals the steps of:
    forming the ratio of the derivative of the color difference signals to the derivative of the low-frequency portion of the luminance signal;
    limiting the magnitude of the ratio of the derivative of the color difference signals to the derivative of the low frequency portion of the luminance signal
    weighting the amplitude of high-frequency components of the luminance signal using the limited ratio; and
    applying the weighted high-frequency luminance components to components of the color-difference signals.

3. Apparatus for enhancing the high frequency response of color television signals which are derived from a luminance signal and a plurality of color difference signals comprising:
    a low-pass filter for separating the low-frequency components of the luminance signal;
    means for subtracting the low-frequency components of the luminance signal from the luminance signal for extracting the high frequency components of the luminance signal; and
    means for adding weighted amounts of the high-frequency luminance components to the derived color television signals where the weights are proportional to components of the color difference signals.

4. Apparatus for enhancing the high frequency response of color television signals which are derived from a luminance signal and a plurality of color difference signals comprising:
    means for forming the ratio of the derivative of the color difference signal to the derivative of the low frequency portion of the luminance signal;
    a limiter for limiting the magnitude of the ratio; and
    means for using the limited ratio to control the amount of high frequency components added to the derived color television signals.

* * * * *